(12) United States Patent
Barray et al.

(10) Patent No.: US 6,464,486 B1
(45) Date of Patent: Oct. 15, 2002

(54) NOZZLE FOR BLOW MOLDING PLASTIC CONTAINERS AND INSTALLATION PROVIDED WITH SAME

(75) Inventors: Alphonse Barray; Patrick Siloret, both of Le Havre Cedex (FR)

(73) Assignee: Sidel, Le Havre Cedex (FR)

( * ) Notice: Subject to any disclaimer, the term of this patent is extended or adjusted under 35 U.S.C. 154(b) by 0 days.

(21) Appl. No.: 09/445,483

(22) PCT Filed: Jun. 11, 1998

(86) PCT No.: PCT/FR98/01208

§ 371 (c)(1),
(2), (4) Date: Jan. 24, 2000

(87) PCT Pub. No.: WO98/57794

PCT Pub. Date: Dec. 23, 1998

(30) Foreign Application Priority Data

Jun. 16, 1997 (FR) ............................................. 97 07609

(51) Int. Cl.[7] ............................................. B29C 49/58
(52) U.S. Cl. ........................................ 425/535; 65/300
(58) Field of Search ................................ 425/535, 536; 65/300, 261

(56) References Cited

U.S. PATENT DOCUMENTS

| | | | | |
|---|---|---|---|---|
| 1,647,532 A | * | 11/1927 | Lorenz | 65/300 |
| 1,832,080 A | * | 11/1931 | Allen | 65/300 |
| 2,331,687 A | * | 10/1943 | Hobson | 425/535 |
| 3,640,671 A | * | 2/1972 | Reilly | 425/535 |
| 3,819,317 A | * | 6/1974 | Higginbotham | 425/535 |
| 3,871,856 A | * | 3/1975 | Trahan | 65/300 |
| 3,880,640 A | * | 4/1975 | Jenkins | 65/300 |
| 3,947,197 A | * | 3/1976 | Mehnert | 425/535 |
| 4,509,969 A | * | 4/1985 | Abbott | 65/300 |
| 4,552,527 A | * | 11/1985 | Hunter | 425/535 |
| 4,818,212 A | * | 4/1989 | Gibbemeyer | 425/535 |

FOREIGN PATENT DOCUMENTS

| | | | | |
|---|---|---|---|---|
| CH | 683 757 A | | 5/1994 | |
| EP | 0 734 836 A | | 10/1996 | |
| FR | 2790704 A1 | * | 9/2000 | |
| GB | 1 536 466 | | 12/1978 | |
| GB | 2131011 A | * | 6/1984 | 65/300 |
| WO | WO 97 13632 A | | 4/1997 | |

* cited by examiner

Primary Examiner—Robert Davis
(74) Attorney, Agent, or Firm—Sughrue Mion, PLLC

(57) ABSTRACT

A blow molding apparatus and a nozzle operable to provide fluid into an interior of a blank. The blank is supported in a mold such that a neck of the blank emerges from a wall of the mold. The nozzle includes a nozzle tip and an opening that surrounds the neck of the blank. A peripheral edge of the opening comes to rest on the mold and a seal is provided between the opening and the mold. In one embodiment, the seal is held on the nozzle by a locking ring.

25 Claims, 5 Drawing Sheets

NOZZLE FOR BLOW MOLDING PLASTIC CONTAINERS AND INSTALLATION PROVIDED WITH SAME

BACKGROUND OF THE INVENTION

The invention relates to improvements made to manufacturing machines for containers made of plastic material, such as flasks or bottles, by blow molding blanks. The blanks are, for example, premolded or intermediate containers obtained during a preliminary phase of processing the plastic material. In particular, the invention relates to a blow molding system and nozzles for use in a molding process.

The manufacturing of containers by blow molding blanks of plastic material is now well known. A blank or preform is obtained either by injection of the plastic material in an injection and forming mold, or by extrusion of the plastic material in a forming mold. The preform is then subjected to an appropriate thermal treatment, depending on the characteristics of the container to be obtained, and/or is placed in a finishing mold containing the shape of the container to be obtained. A nozzle is then introduced into the opening (the neck) of the preform and a blowing fluid, generally air under high pressure, is injected into the preform to inflate it and coat the walls of the mold with the material, thus making it possible to obtain the container. Preferably, particularly in the applicant's machines that make containers using preforms that were previously injected, the blow molding is preceded or accompanied by drawing (or elongation) of the preform using an elongating rod. Again preferably, when the drawing precedes a blow molding process using high-pressure air, the drawing is accompanied by a premolding process using air at a lower pressure to avoid a condition where, especially at the time of drawing, the material does not contract onto the rod.

When the blank is an intermediate container, the intermediate container is generally obtained using a first container, the first container itself obtained by blow molding of a preform in a first mold. The first container, after it leaves the first mold, is subjected to specific processing, typically thermal, following which the intermediate container is obtained. The intermediate container is then placed in a second mold where the intermediate container is changed into the final container by injection of a blowing fluid using a nozzle identical to the one mentioned above.

European patents granted under the numbers 237459 and 442836, in the name of the applicant, describe two variations in the equipment that make it possible to obtain a first container using an injected preform, then, after changing the first container into an intermediate container, to obtain a final container with good mechanical properties. This is particularly so for containers filled at high temperature or filled with gaseous or carbonated drinks. Typically, the procedures and equipment for manufacturing the containers described above requires a phase where a single intermediate container is obtained. As such, it would be very easy to imagine obtaining several successive intermediate containers before obtaining the final container.

The molds used for the manufacture of final containers, or each mold for obtaining a container from which an intermediate container is obtained, are generally made of at least two parts which can be separated or moved close to each other. Each of these two parts has half the shape of the container to be obtained (e.g., base, wall, shoulder). Preferably, however, the known molds have three parts: one part with the shape of the base of the container, and two parts to make up the wall and shoulder of the container. This preferred structure makes mold release easy when the base of the container has certain types of relief patterns (particularly petal-shaped bases). The parts are separated and removed from each other when the blank is put in place and at the time the container is ejected. The parts are then moved close together, and the mold is closed during the blow molding phases (with or without drawing and/or premolding).

One disadvantage of the equipment or machines for manufacturing containers (intermediate or final) concerns the structure of the nozzles that are used. It is known that the neck of the final container is generally obtained at the time the preform is manufactured. When the preform is transformed into the container, either a final container or an intermediate container, the dimensions of the neck must not be changed or be changed only very little. Still and consequently, the dimensions of the neck of the intermediate container must not vary or can vary only little, and the final container must therefore have a neck identical to that of the preform. In fact, the neck has either threads for receiving a threaded cap or a reinforced edge for holding a crimped cap or a stopper. It is therefore very difficult to control the deformation of the neck after formation of the preform, and is thus preferable to keep the neck in the same condition after successive transformations.

It is for this reason that, at the time of processing the preform to the final or intermediate container and, in this latter case of an intermediate container into another container (intermediate again or final), the neck is supported on the outside of the mold and is not modified by the blow molding. The nozzle is made up of a tube on which the blow molding end (tip of the nozzle) is contracted so that it can be inserted into the opening of the blank. Typically, the end of the nozzle has the cross section of a truncated cone. The diameter at the base of the truncated cone, thus of the nozzle, is less than that of the opening. As a result, when the nozzle is introduced into the neck, contact ends up being established between the truncation of the cone and the interior peripheral edge of the lip of the preform, assuring seal integrity at the time of blow molding and keeping the blank in a good position with respect to the mold.

However, this type of nozzle is not completely appropriate because of the high pressures necessary for blow molding (typically 40 bars in the machines of the applicant). Because of the high pressures, it is necessary to exercise a significant support pressure between the nozzle and the preform to avoid leaks. Thus, it is necessary that the neck has a material thickness significantly great to give it adequate rigidity so that it is not deformed by the nozzle at the time of the support. Still, the price of a container is largely connected with the cost of the material. As such, one trend that has developed recently is to obtain blanks with a reduced neck to reduce the cost price, but there is a lower limit below which the nozzle will cause the neck to burst.

Further, the same type of equipment can be used to manufacture a series of different containers. The user is sometimes required to modify the individual settings of his equipment. If the height of the neck is modified and/or if the diameter of the neck is modified, it is necessary to modify the regulation of the nozzle flow and/or possibly to change the nozzle. This results in a loss of time, which can add surcharge costs for using the manufacturing equipment. In addition, these nozzles are poorly adapted for blow molding of sterile or aseptic containers using a sterilizing or antiseptic fluid because of the contact zone between the interior of the neck and the nozzle. If the nozzle has not been sterilized before blow molding and it remains in this condition, septic or non-sterile particles may be found there and contaminate the interior of the container.

Also when a drawing rod is present, which is the rule, the drawing rod slides axially into the interior of a cylindrical opening in the nozzle and is oriented along the longitudinal axis of the latter, and a ring space is left open around the rod to permit the passage of the blowing fluid around the rod in this opening. But, the cross section of this space is necessarily limited in such a way that the passage of the fluid is slowed down.

SUMMARY OF THE INVENTION

The present invention seeks to overcome the aforementioned problems. According to the present invention, a nozzle is provided for carrying the blowing fluid into the interior of a blank supported below its neck in a blow molding mold, in such a way that the neck emerges from the mold, the nozzle having an opening for bringing the fluid into the blank is characterized in that the opening has dimensions such that when a blank is in place in the mold and the nozzle is in the blow molding position, the opening surrounds the neck and the peripheral edge of the opening opposite the blank making up the tip of the nozzle comes to rest on the mold and means for sealing are provided at the level of this support.

The nozzle according to the present invention thus makes it possible to eliminate all the problems mentioned above. In the nozzle of the present invention, there is no longer direct support on the blank to ensure sealing, so that reduced necks may be used. Also in the present invention, the problems connected with changes in settings in conventional nozzle devices are resolved. That is, it is enough to calibrate the opening in such a way that it can contain larger necks than the machine will be called upon to process. Further, since the blowing fluid arrives around the neck, the problems connected with antiseptics or sterilization are resolved. The blowing fluid also arrives around the neck in such a way that not only the interior of the container, but also the exterior of the neck is cleaned. In addition, if there is no drawing rod, a larger passage cross section is available to the blowing fluid since the tip of the nozzle is not on the interior but is on the exterior of the neck, which results in greater blow molding efficiency.

In a first variation of the present invention, sealing means are attached to the end of the nozzle tip. In a second variation, the sealing means are fastened on the installation mold to which the nozzle is connected.

BRIEF DESCRIPTION OF THE DRAWINGS

Other characteristics and advantages of the present invention will be apparent to the reader of the description below with reference to the attached figures, in which.

DESCRIPTION OF PREFERRED EMBODIMENTS

Figure 1:
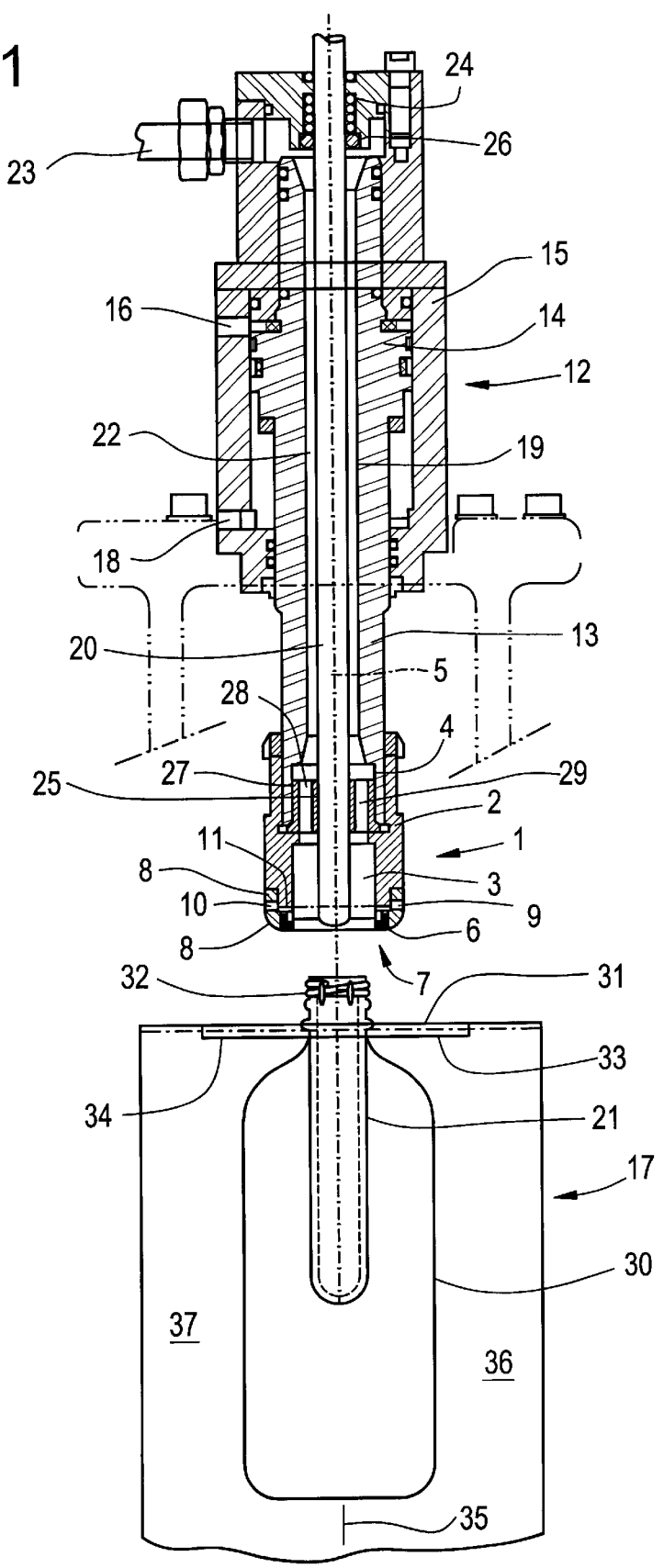
FIG. 1 is a schematic cross section view of one part of the system using a first version of the nozzle when the nozzle is not in the blow molding position.
Figure 2:
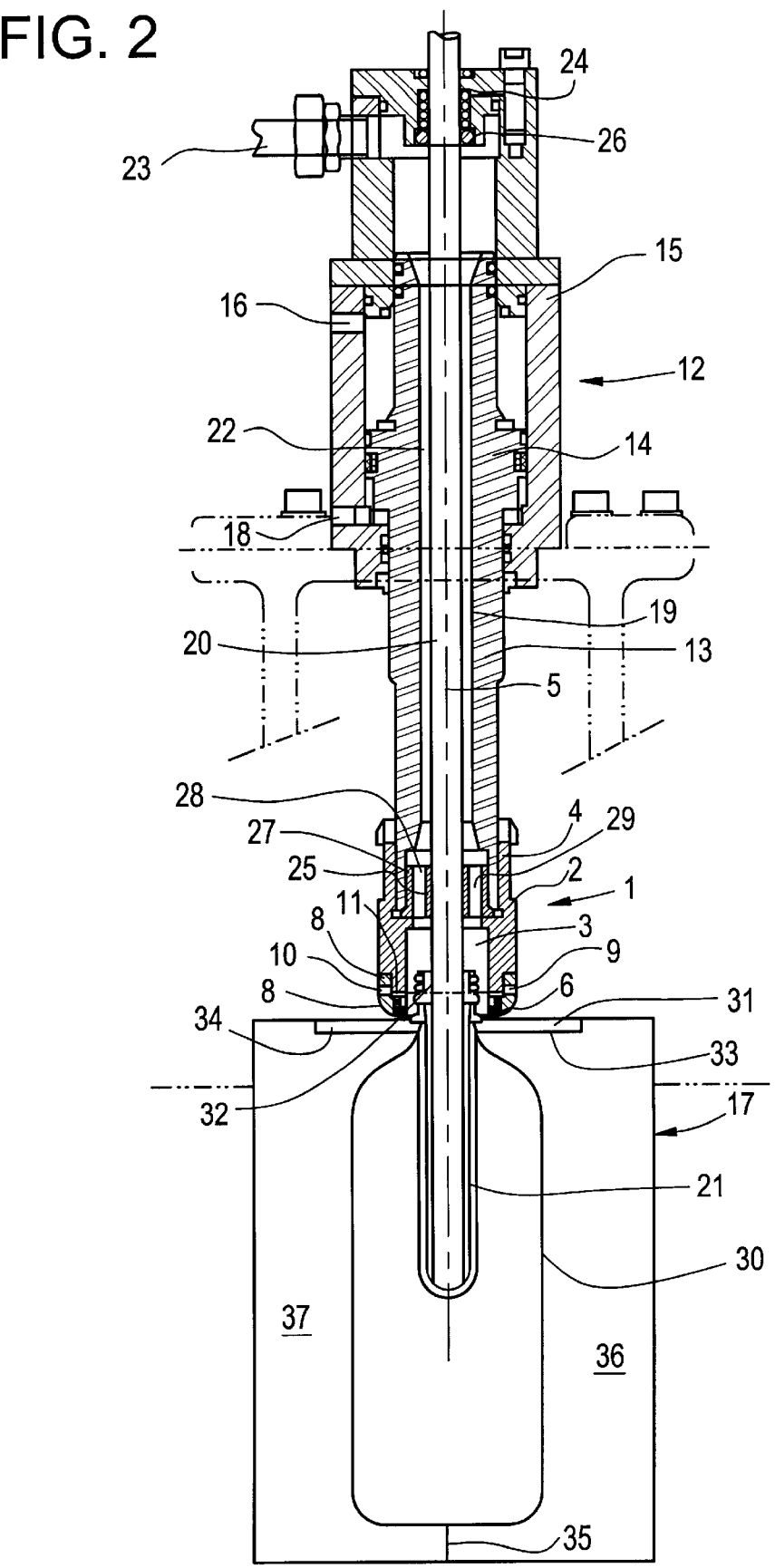
FIG. 2 is a cross section view corresponding to the first version when the nozzle is in the blow molding position.
Figure 3:
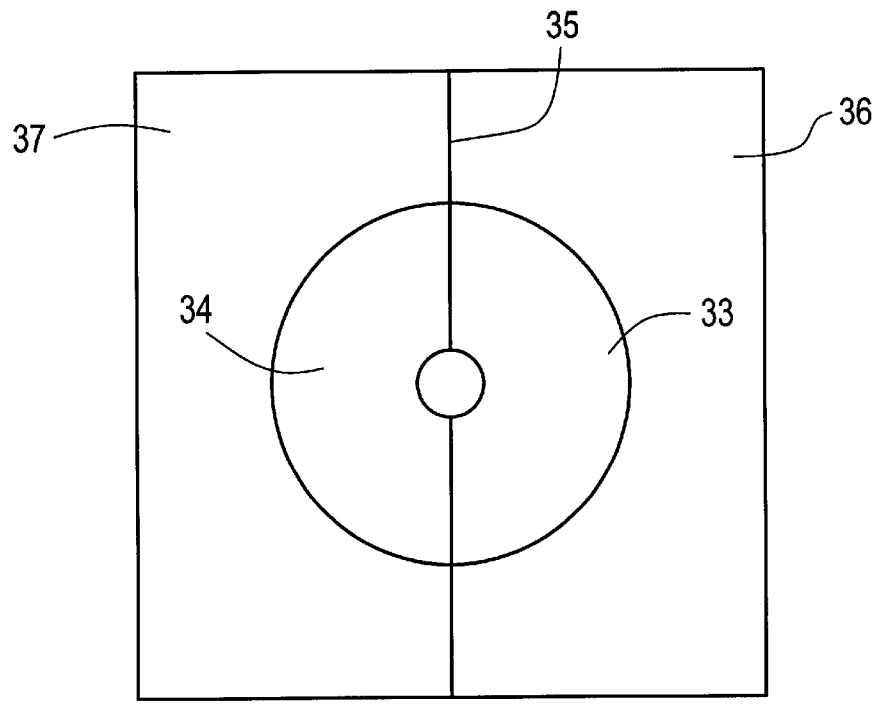
FIG. 3 is a simplified view from above a mold in a closed position that can be used with this first variation.

A first embodiment of a nozzle according to the present invention and the part of the blow molding apparatus with which it can be connected are shown in FIGS. 1 and 2. The nozzle, designated in its entirety by the reference number 1, has a body 2 in the form of an essentially cylindrical sleeve tube pierced along its length by a coaxial hole made up of two openings 3, 4 coaxial to axis 5 of the nozzle and connected with each other by a first one of their ends. According to the invention, a first 3 of these openings makes up the opening for carrying the fluid into a blank when the nozzle is in place on a blow molding system as will be described below.

In the embodiment illustrated in FIGS. 1 and 2, a lip seal 6 is fastened around the second end of the first opening 3 and emerges axially, in fact, making up the tip 7 of the nozzle. The function of this seal 6 is to ensure sealing at the time of blow molding as will be explained further on. The seal 6 is held around the second end of the first opening 3 in the body 2 of the nozzle, for example, by using a holding ring 8 screwed around the end. Preferably, vents 9, 10 of which the function will be explained later, traverse the thickness of the ring 8 radially. These vents are preferably distributed regularly around the ring and open out on the interior of same at the level of the support 11 between the body 2 of the nozzle and the end of the seal 6 opposite to that which in fact makes up the tip 7 of the nozzle.

In a known manner, the nozzle 1 is fastened by its side opposite to the one where the first opening 3 is to an actuator 12 of the nozzle. More specifically, the body 2 is connected with an axle 13 connected to a piston 14 running in a cylinder 15. This actuator 12 comprises the piston 14, cylinder 15 and axle 13. Preferably, as illustrated in FIGS. 1 and 2, the body 2 of the nozzle is screwed onto the end of the axle 13. For this purpose, the second opening 4 in the body 2 is threaded and the end of the axle 13 is threaded in the corresponding manner.

The actuator has a double purpose. That is, a first opening 16 provided at one end of the cylinder 15 makes it possible to pull the piston and thus the nozzle 1 towards the mold 17 and a second opening 18 makes it possible to move the nozzle away from the mold.

In a known manner, the assembly made up of the piston 14 and the axle 13 that extends it is pierced along its entire length by a tubular opening 19, coaxial to the axis 5 of symmetry of the nozzle 1 and of the actuator 12. A connected drawing rod 20 of the blank 21 is placed in this opening. The interior diameter of the opening 19 is greater than the exterior diameter of the rod 20 in such a way that an annular space 22 surrounds the periphery of the rod 20, making possible the passage of preblowing fluid and/or blowing fluid toward the first opening 3 of the nozzle 1 and thus toward the blank 21 in order to make the container desired in the mold 17. The annular space 22 communicates with a pipe 23 for carrying the fluid under pressure for premolding and/or molding. This pipe 23 is, in a known manner, connected to one or several sources of the fluid.

The rod 20 can move relative to the assembly made up by the cylinder 15 and the subassembly piston 14, axle 13, nozzle 1. The known means for movement of the rod are not shown, however, the means for movement may be another actuator and/or a gear mechanism or any other appropriate means. In a known manner, the guide bearings 24, 25 of the rod 20 are provided at the end of the cylinder 15 and at the juncture between the axle 13 and the nozzle 1. In addition, at least the guide at the end of the cylinder is sealed. For this, either the bearing 24 is sealed or, preferably, it is completed by a seal 26. The seal integrity at this level has the goal of preventing any leak of the blowing fluid around the rod 20.

The guide bearing 25 at the juncture between the axle 13 and the nozzle 1 is, for example, made up of a ring that is pressed into a corresponding recess 27 arranged at the end of the axle 1 and held in place by the nozzle when it is mounted on the axle 13. The ring is also pierced along its entire length by at least two openings 28, 29 each communicating with the annular space 22 and the first opening 3 of the nozzle 1 so that the blowing fluid can circulate from the carrying pipe 23 toward the tip of the nozzle. Naturally, the fastening of the nozzle on the axle 13 is assured of a good seal either by an adequate crimping of the nozzle 1 on the axle 13, or by using appropriate methods such as seals or any other known device (sealing tape, sealing paste, filler, etc.).

In FIG. 1, the nozzle 1 and the rod 20 are shown in raised position (in the case where the mold is located below the nozzle). The nozzle is thus at a distance from the blank 21, and the rod 20 is drawn into the nozzle. The blank 21, here a preform, is in place in the mold 17 containing the shape 30 of the container to be obtained.

In FIG. 2, the nozzle is in blow molding position. The tip 7 of the nozzle, more specifically the seal 6 that makes it up, is supported on the upper edge 31 of the mold and the rod 20 is shown in a position according to which its free end is supported on the base of the preform, i.e., in a position immediately preceding the drawing of the preform. This figure shows only the dimensions of the first opening 3 of the nozzle 1 which are such that the neck 32 of the blank 21 is largely contained, i.e., surrounded, in this opening. Preferably, and in a known manner, the upper edge part 31 of the mold 17 on which the seal 6 comes to rest is a ring made up of two half-rings 33, 34 across from each other at the level of the plane of seal 35 between the two half-molds 36, 37. This ring is a part that can be changed.

The function of the vents 9, 10 close to the tip 7 of the nozzle is to prevent the seal 6 from deteriorating when the nozzle is moved away from the mold after blow molding while fluid under pressure is still present. If these vents were not present, the lip of the seal 6 would have a tendency to be pushed toward the exterior at the beginning of the removal because of the high pressure in the nozzle. With the vents, when the nozzle starts to move away from the mold 17, the seal is no longer pushed forcefully against the ring of the neck 33, 34.

In fact, because of the pressure that is on the interior, the peripheral interior surface of the seal has a tendency to move away from the zone on which it was supported in the body 2 of the nozzle, which involves the appearance of a gap between the seal and the body of the nozzle, making it possible for part of the fluid to escape through this gap in the direction of the vents and thus towards the exterior.

Figure 6:
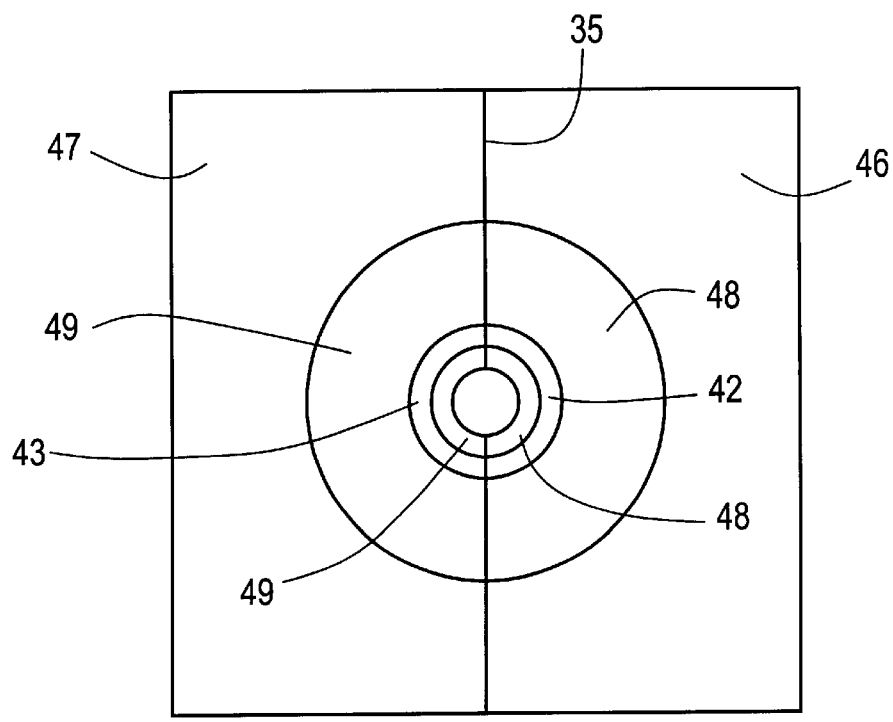
FIG. 6 is a simplified top view of a mold, in closed position, which can be used with the second variation.
Figure 4:
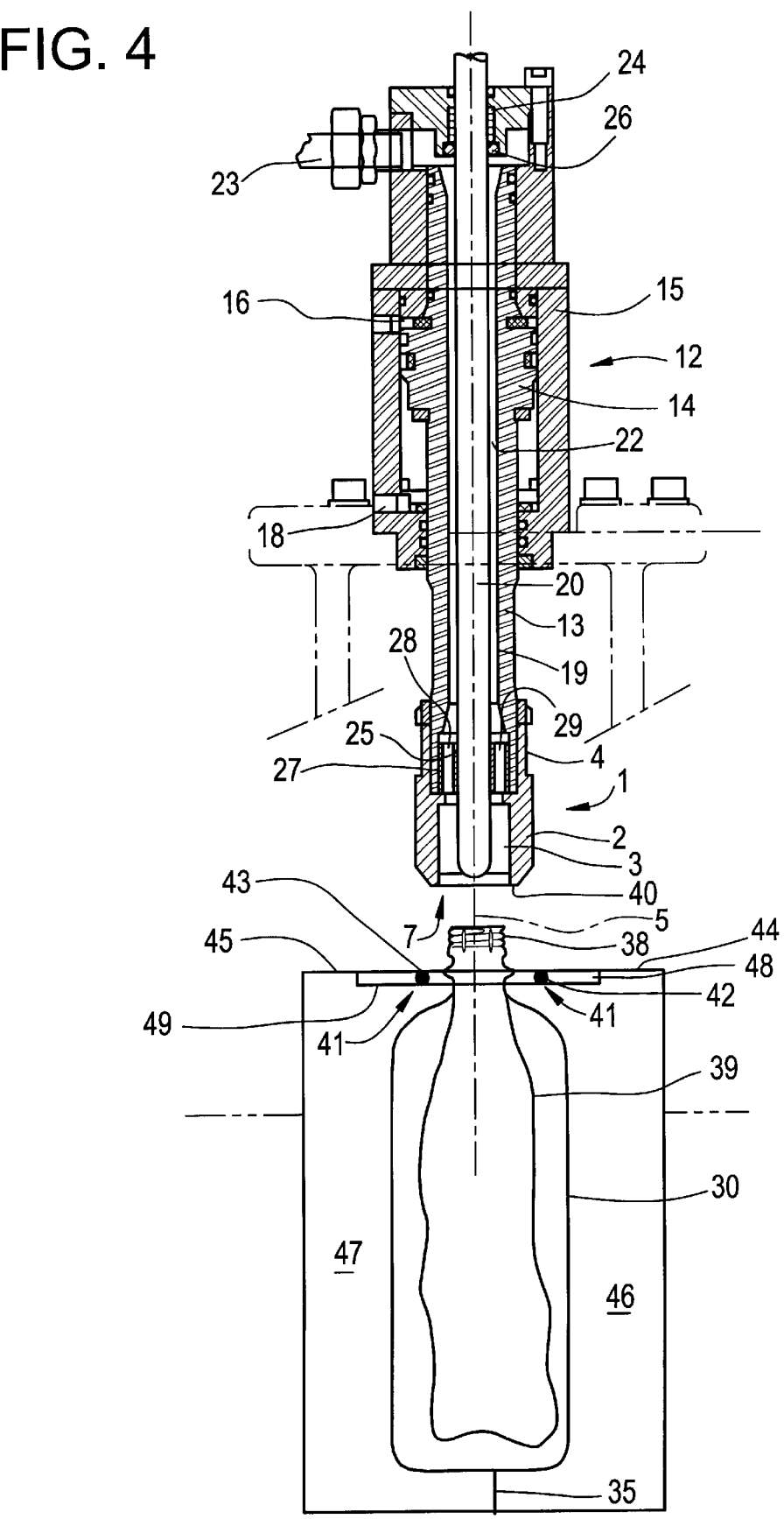
FIG. 4 is a schematic cross section view of a part of the system using a second variation of the nozzle when the nozzle is not in the blow molding position.
Figure 5:
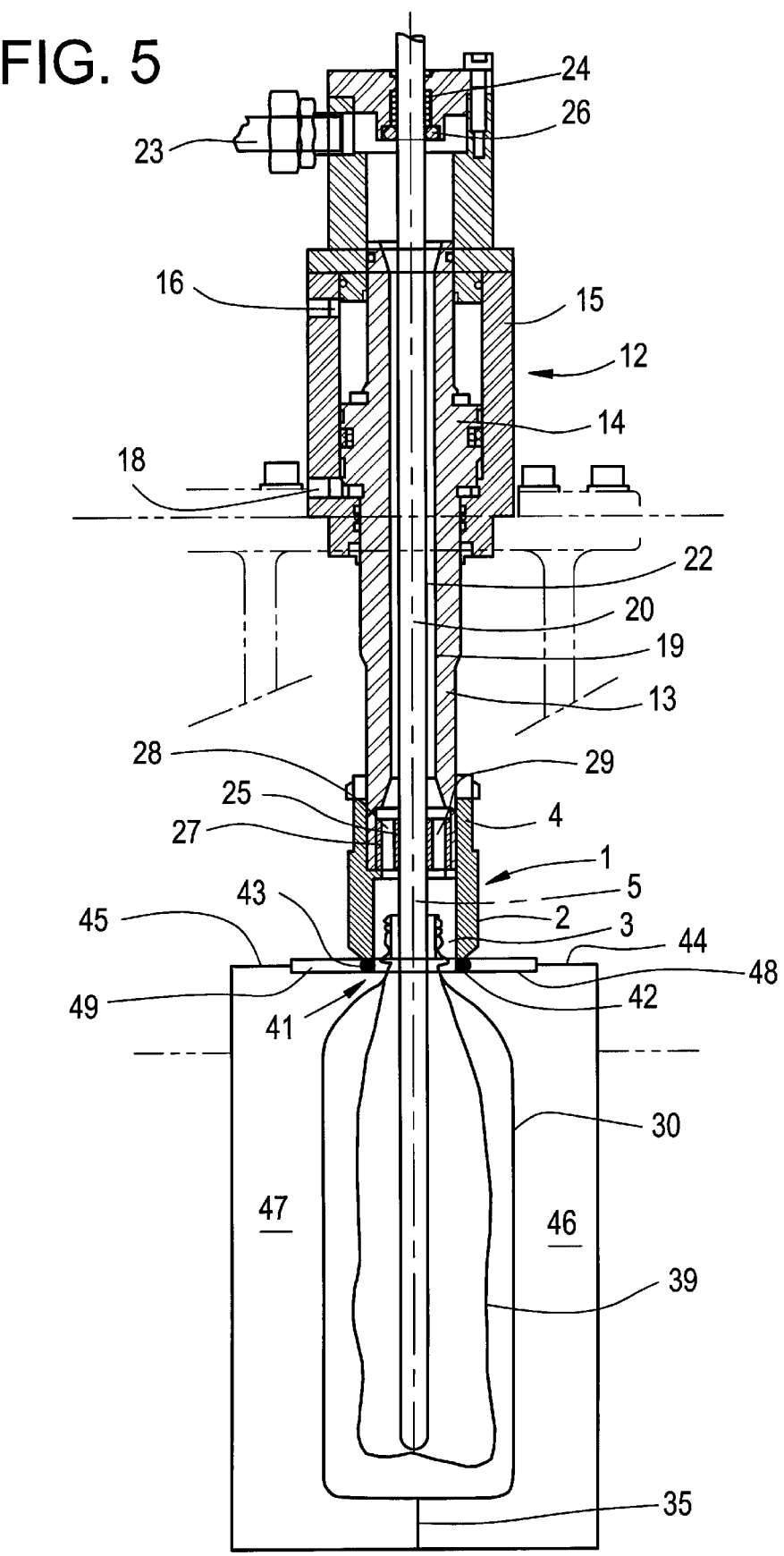
FIG. 5 is a cross section view corresponding to the second variation when the nozzle is in the blow molding position.

FIGS. 4 and 5 show a variation of the nozzle. FIG. 6 shows how the mold must be adapted in order to work with this variation. The nozzle shown in this variation differs from that shown on FIGS. 1 and 2 only by the means for ensuring seal integrity between the tip 7 of the nozzle and the mold. Also, the same elements have the same reference numbers and reference is made to the description of FIGS. 1 and 2 for the parts concerning them. The nozzle 1 has a body 2 that is pierced by two openings 3 and 4. A first 3 of these openings is used to surround the neck 38 of a blank 39, in this case an intermediate container with a narrowed body such as described in the European patent number 442836 in the name of the applicant.

The second opening 4, threaded, is screwed onto the corresponding threads of an axle 13 connected to the piston 14 and a drawing rod 20 moves in the actuator 12. The difference between this nozzle and that described on FIGS. 1 and 2 involves the fact that the tip 7 of the nozzle is not made up of a seal but by the edge 40 of the opening of the first opening 3 toward the exterior, the first opening which is thus made completely in the mass of the body 2. The seal integrity is ensured, when the nozzle is in place (FIG. 5), by a seal 41 made up of two semi-circular seal parts 42, 43, arranged respectively in the upper wall 44, 45 of each of the half-molds 46, 47 where preferably in the neck ring, made up of two semi-rings 48, 49, arranged respectively on each of the half-molds, when this ring is present (FIG. 6). One advantage of this variation is that the seal is held more easily in place and does not slip when the nozzle is moved away. It has been confirmed, that a nozzle according to the invention does not require that the blank 21; 39 be placed firmly against the mold at the level of the ring at the time of blow molding. Thus it is completely possible to make the containers without using the drawing rod 20 which, when it is in place, holds the blank in the mold. Even if the rod is not used, the blank does not vibrate because of the effect of the fluid and the fluid does not escape to the interior of the mold on the outside of the blank. The fluid is directed toward the interior of the blank without any particular problems.

It is naturally understood that the invention is not limited to the embodiments described. In particular, the fastening of the nozzle to the actuator could be ensured by any means other than the intermediary of a threaded hole 4 and a screw corresponding to the axle 13 of the actuator; in the same way, the drawing rod 20 would not have to be present, the latter being nothing more than an accessory, not of the nozzle, but of the system itself.

What is claimed is:

1. Nozzle (1) for blow molding for carrying blowing fluid into the interior of a blank (21; 39) supported below its neck (32, 38) in a mold (36, 37; 46, 47) wherein said neck emerges from a wall (31; 44, 45) of the mold, the nozzle (1) having an opening (3) carrying fluid into the blank, characterized in that the opening (3) has dimensions such that when the blank is in place in the mold and the nozzle (1) is in the blow molding position, the opening surrounds the neck, and the peripheral edge (6; 40), of the opening opposite the blank that makes up the tip (7) of the nozzle, comes to rest on said wall (31; 44, 45) of the mold, and sealing means (6; 42, 43) are provided at the level of the support zone.

2. Nozzle according to claim 1, characterized in that the sealing means are made up of a seal (6) surrounding the tip (7) of the nozzle.

3. Nozzle according to claim 2, characterized in that the seal is held on one end of the body (2) of the nozzle by a locking ring (8).

4. Nozzle according to claim 3, characterized in that this ring is screwed around the said end of the body (2).

5. Nozzle according to claims 3, characterized in that the ring is provided with at least one vent (9, 10) passing through its thickness and opening at the level of the support plane (11) between the seal (6) and the said end of the body (2).

6. Blow molding system for containers starting with blanks (21; 39), characterized in that it has a nozzle according to claim 1.

7. Blow molding system for containers using blanks (21; 39), characterized in that it has a nozzle according to claim 1 and the sealing means (42, 43) are made up of a seal (41) supported by the wall of the mold from which the neck (32, 38) emerges and encircling said neck.

8. Blow molding system according to claim 7, characterized in that the mold is made up of two half-molds (46; 47), the seal is made up of two sections (42; 43)each held respectively by a half-mold.

9. System according to claim 6 above, characterized in that the first opening (3) of the nozzle communicates (22, 28, 29) with a tube (23) for carrying the fluid.

10. System according to claim 9, characterized in that the nozzle is connected to an actuator (12) of the nozzle held by the system, and the connections (22, 28, 29) are made in the actuator.

11. System according to claim 6, characterized in that it has a drawing rod (20) for the blank (21; 39) passing through the first opening (2) and being able to move relative to same.

12. System according to claim 10, characterized in that the nozzle (1) is fastened to an axle (13) of the actuator (12), the said axle being connected with a piston (14) running in a cylinder (15) held by the system.

13. System according to claim 12, characterized in that the nozzle (1) is fastened to the axle (13) by screw threads and to do this has a second opening (4) that is threaded, and the axle (13) is threaded in a corresponding manner.

14. A nozzle operable to provide fluid into an interior of a blank, the blank supported in a mold such that a neck of the blank emerges from a wall of the mold, the nozzle comprising:

a nozzle tip;

a fluid passage that surrounds the neck, wherein a peripheral edge of the fluid passage comes to rest on the mold; and a seal between the fluid passage and the mold.

15. A nozzle according to claim 14, wherein the seal surrounds the nozzle tip.

16. A nozzle operable to provide fluid into an interior of a blank, the blank supported in a mold such that a neck of the blank emerges from a wall of the mold, the nozzle comprising:

a nozzle tip;

an opening that surrounds the neck, wherein a peripheral edge of the opening comes to rest on the mold; and a seal between the opening and the mold, wherein the seal surrounds the nozzle tip, and further wherein the seal is held on the nozzle by a locking ring.

17. A nozzle according to claim 16, wherein the locking ring uses screw threads to hold the seal on the nozzle.

18. A nozzle according to claim 16, wherein the locking ring is provided with at least one vent passing through the locking ring.

19. A blow molding apparatus comprising:

a mold for forming a predetermined shape;

a nozzle operable to provide fluid into an interior of a blank, the blank supported in the mold such that a neck of the blank emerges from a wall of the mold, the nozzle comprising:

a nozzle tip;

fluid passage that surrounds the neck, wherein a peripheral edge of the fluid passage comes to rest on the mold; and a seal between the fluid passage and the mold.

20. A blow molding apparatus comprising:

a mold for forming a predetermined shape, wherein the mold comprises two half-molds;

a nozzle operable to provide fluid into an interior of a blank, the blank supported in the mold such that a neck of the blank emerges from a wall of the mold, the nozzle comprising:

a nozzle tip;

an opening that surrounds the neck, wherein a peripheral edge of the opening comes to rest on the mold; and a seal between the opening and the mold, wherein the seal comprises two sections, each of the two sections held by one of the two half-molds.

21. A blow molding apparatus according to claim 19, wherein the fluid passage communicates with a tube for carrying the fluid into the interior of the blank.

22. A blow molding apparatus according to claim 19, wherein the nozzle is connected to an actuator, and the connection of the nozzle to the actuator is made in the actuator.

23. A blow molding apparatus according to claim 19, further comprising a moveable drawing rod for elongating the blank passing through the fluid passage.

24. A blow molding apparatus according to claim 19, further comprising an axle connected with a piston running in a cylinder such that the nozzle, connected to the axle, is operable to provide the fluid into the interior of the blank.

25. A blow molding apparatus according to claim 24, wherein the nozzle is connected to the axle by screw threads.

\* \* \* \* \*